United States Patent [19]

Babel et al.

[11] Patent Number: 5,318,396
[45] Date of Patent: Jun. 7, 1994

[54] PALLET CARRIER FOR MACHINE TOOLS

[75] Inventors: Werner Babel, Pfronten; Peter Haas, Rieden, both of Fed. Rep. of Germany

[73] Assignee: Maho Aktiengesellschaft, Pfronten, Fed. Rep. of Germany

[21] Appl. No.: 934,369

[22] Filed: Aug. 21, 1992

[30] Foreign Application Priority Data

Aug. 23, 1991 [DE] Fed. Rep. of Germany ....... 9110427

[51] Int. Cl.$^5$ .............................................. B23C 3/06
[52] U.S. Cl. ................................... 409/137; 409/219
[58] Field of Search .............. 483/14; 29/33 P, 563; 409/137, 159, 163, 172, 219, 225, 235; 408/56; 198/346.1

[56] References Cited

U.S. PATENT DOCUMENTS 3,485,138 12/1969 Staehle ............................ 409/137
3,825,245 7/1974 Osburn et al. .................. 198/346.1
4,172,512 10/1979 Clegg et al. .................... 198/346.1
4,444,534 4/1984 Bergman ........................ 409/164
4,797,989 1/1989 Cherko ............................ 483/14

FOREIGN PATENT DOCUMENTS 3232367 3/1984 Fed. Rep. of Germany .
3702865 8/1988 Fed. Rep. of Germany .

Primary Examiner—Daniel W. Howell
Attorney, Agent, or Firm—Weingarten, Schurgin, Gagnebin & Hayes

[57] ABSTRACT

The subject of the present invention is a pallet carrier for machine tools, said carrier being mounted on an NC work table and comprising profiled slideways as well as centering elements and hydraulic clamping members. For thorough cleaning and improved adjustment the invention provides pressure-fluid ducts within the pallet carrier coupled to quick-action connectors in the front of the pallet carrier and leading to spray nozzles which are disposed within the slide faces of the said slideways.

3 Claims, 3 Drawing Sheets

PALLET CARRIER FOR MACHINE TOOLS

FIELD OF THE INVENTION

The present invention is directed to a pallet carrier for machine tools, said carrier being fixedly mounted on the work table and comprising profiled slideways as well as centering bolts and hydraulic clamping members for fixing a pallet in a precise position.

BACKGROUND OF THE INVENTION

Pallet carriers of the above-specified type are known in various forms and are employed in program-controlled milling and drilling machines as well as machining centers so as to permit rapid and safe changing of the works loaded on pallets. One of the basic prerequisites for the repeated performance of identical machining operations to be carried out on the changed works is the automatic and high-precision positioning of the switched pallets on the pallet carrier and their firm mounting in the respective prescribed machining positions. With known pallet carriers there arises the problem that the pallets at the end of their transfer movement rest directly on the slideways and upon insertion of the centering bolts still have to perform some slight lateral adjusting movements in the transitional regions between static friction and sliding friction before the hydraulic clamping members become fully effective. This affects the precise positioning of the pallet on the pallet carrier.

Further, it has been found that the operability of full automatic machine tools is significantly reduced by deposits constituted of solid particles, fine chips and the like on the slide faces of the various slideways. When some object such as a pallet moves across these slide faces, said deposits will be urged into the frequently employed ductile slideway linings and will result in damage to the fine-finished slide faces.

SUMMARY OF THE INVENTION

It is the objective of the present invention to provide a pallet carrier for program-controlled cutting machine tools, said pallet carrier permitting location of respective pallets in their predetermined positions with increased precision and also providing for effective cleaning of the critical components upon each pallet switching operation.

In accordance with the present invention the specified objective is achieved in that pressure-fluid ducts are formed in the pallet carrier and are connected to quick-acting closure means in the front of the pallet carrier and lead to spray nozzles which are disposed in the slide faces of the slideway.

In accordance with the present invention it is provided that upon each switching operation, i.e. when a pallet is moved or placed onto the slideways of the pallet carrier, a flushing liquid is introduced at a high pressure of approximately 40 bars into the pressure-fluid ducts of the pallet carrier. This pressure-fluid is jetted against the advancing guide faces of the respective pallet and flows sideways under high pressure through the gap formed between the two guide faces of the pallet carrier and the pallet. Due to the high kinetic energy of said fluid stream, dirt particles are loosened from one or other of the slide faces and become entrained in the fluid. Moreover, upon operation of the clamping members, i.e. while the pallet is clamped on the pallet carrier, said pressure fluid creates a practically friction less sliding cushion of high hydraulic pressure which due to the lack of friction aids in the slight lateral movements required for adjusting the pallet. Consequently, the present invention offers the advantages that the slide faces of the slideways are effectively cleaned from deposits, on the one hand, and that a more exact positioning of the pallet is achieved, on the other hand.

In order also to enable removal of deposits or other contaminants from the clamping or adjusting members the invention provides in a suitable further embodiment that branch ducts in communication with the pressure-fluid ducts lead to the clamping members or centering bolts located in the slideways, whereby proper operation of these components is ensured.

In order to achieve an automatic supply of pressure fluid to the ducts disposed in the pallet carrier it is provided in accordance with another improvement of the present invention that the quick-action connectors provided at the front face of the pallet carrier are configured as hollow cylinders and are outwardly covered by a hood. Fittings are provided on the associated end face of a pallet transfer slide, said fittings being in communication with a flushing fluid pump through corresponding pressure conduits. Upon an advancing movement of the slide said fittings will automatically come into fluid-tight engagement with the hollow-cylindrical quick-action connectors in the pallet carrier. In this respect it may be useful to control the supply of pressure-fluid to said fittings such that a fluid jet is emitted from said fittings already prior to the making of the coupling in order to remove any deposits from the outer surface of the quick-action connectors.

DESCRIPTION OF THE DRAWINGS

Further particularities and advantages of the present invention have been realized in the embodiment which will be described in detail below with reference to the accompanying drawing, in which.

DETAILED DESCRIPTION

Figure 1:
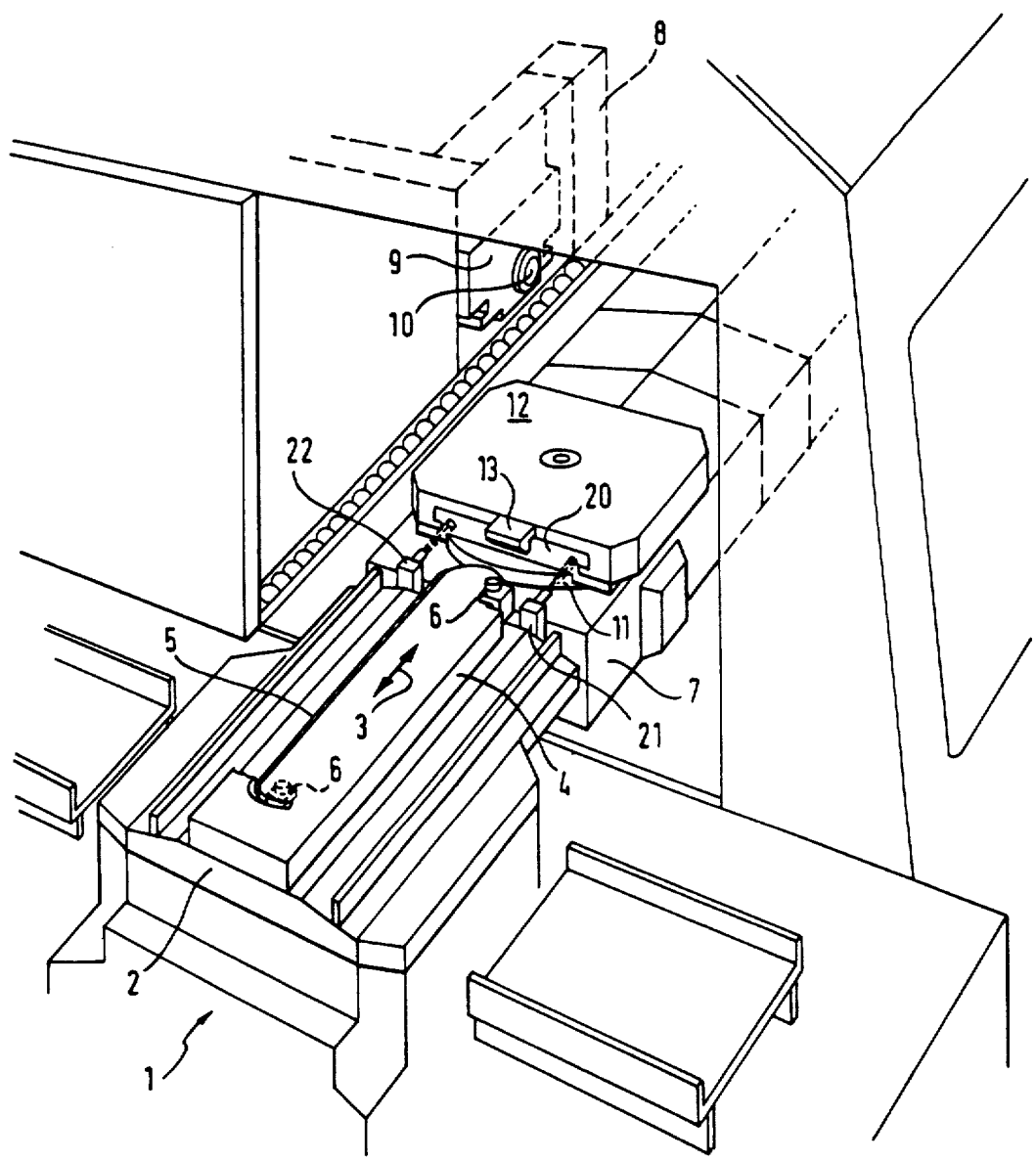
FIG. 1 is a perspective view of a pallet transfer station with the work table of a milling machine.

The transfer station illustrated in FIG. 1 comprises on a supporting frame 1 a slide 2 mounted on said supporting frame 1 for movement in the direction of the dual arrow 3 and adapted for rotation on said supporting frame 1 about a vertical axis (not illustrated). On a central web 4 of the slide 2 a chain 5 is mounted which has secured thereto a driver 6 with a pin projecting therefrom. By means of a drive motor, which is not illustrated, said driver may be moved together with a chain 5 from a rearward position indicated in dashed lines to the final forward position shown in FIG. 1.

On an NC table 7 of the machining center, which is illustrated only in part and comprises a double column 8 and a work spindle 10 mounted in a horizontal headstock 9, a pallet 12 is clamped by way of a turntable 11, said pallet having rectangular shape With bevelled corners and being provided on one end face thereof with a hook-like driver 13. The pallet 12 is mounted on a pallet carrier 20 which may be rotatably disposed on the top of the NC table 7. As will be particularly apparent from FIG. 2, the pallet carrier 20 includes two slideways 14, 15 the fine-finished surfaces of which respectively constitute a slide face for the correspondingly finished counter-faces of the pallet 12 to be loaded thereon. Two posts 21, 22 are mounted on the end face of the slide, each of said posts carrying at the front thereof a fitting 23, 24. Moreover, the slide 2 has two pressure-fluid conduits 25, 26 formed therein which open into the fittings 23, 24 and are in communication with a high-pressure pump (not illustrated) for producing a fluid pressure of at least 40 bars. Check valves (not illustrated) adapted to be opened and closed via control means are disposed within said high-pressure conduits 25, 26.

The plate-like pallet carrier has pressure-fluid ducts 30, 31 formed therein which open into quick-action connectors 32, 33 closed by stop plugs and lead to nozzle-like spray apertures 34a, 34b and 35a, 35b. The quick-action connectors 32, 33 are disposed on the forward end of the pallet carrier such that upon an advancing movement of the slide 2 the fittings 23, 24 thereof will come into liquid-tight engagement with said quick-action connectors. In the position of the slide 2 illustrated in FIG. 2, in which the fittings 23, 24 are not yet in engagement with the quick-action connectors 32, 33, opening of the check Valves (not illustrated) causes sharp jets of pressure fluid to be sprayed against the quick-action connectors 32, 33 outwardly covered by hoods so as to remove any deposits from the end faces thereof.

Figure 2:
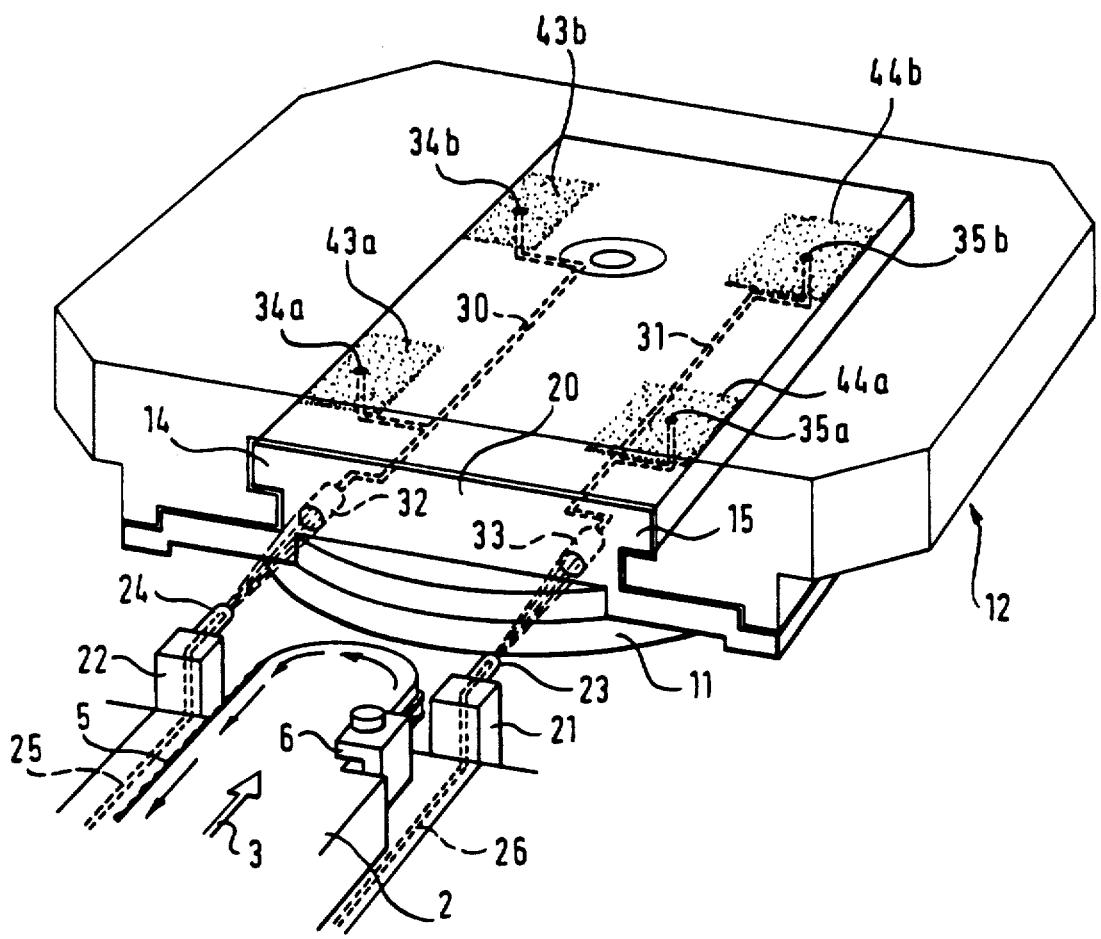
FIG. 2 is an enlarged perspective view showing the pallet carrier with a pallet loaded thereon.
Figure 3A:
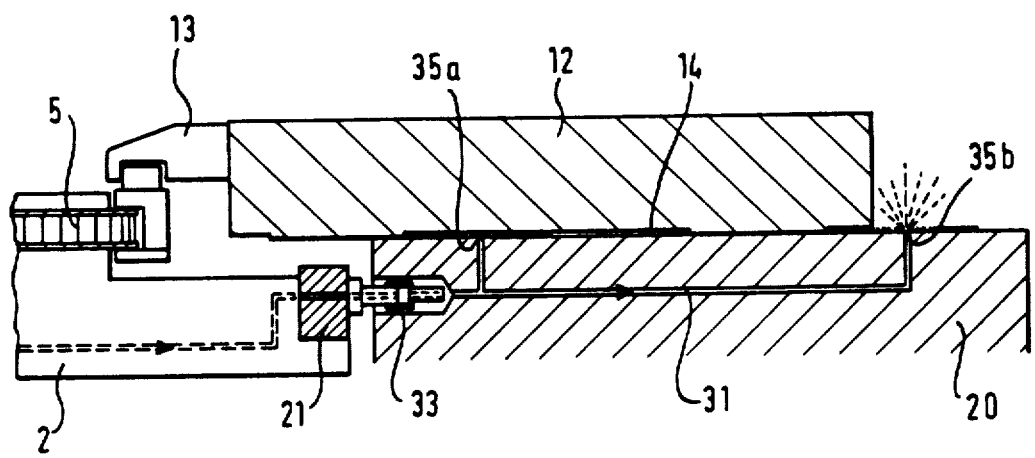
FIGS. 3a and 3b illustrate two phases of loading a pallet onto a pallet carrier.
Figure 3B:
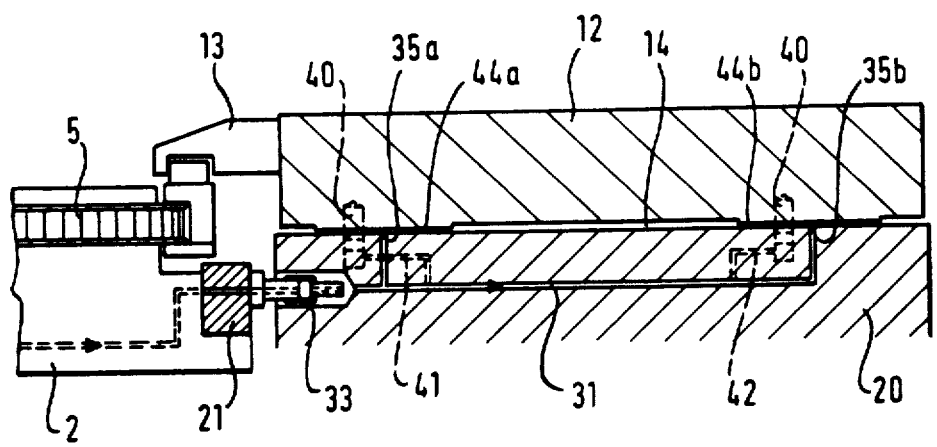

As will be apparent from a consideration of FIGS. 2, 3a and 3b, the engagement between the two fittings 23, 24 and the quick-action connectors provided on the pallet carrier 20 results in fluid communication between the pressure-fluid ducts 30, 31 in the pallet carrier and the high-pressure conduits 25, 26 in the slide 2. This is when—as illustrated in FIG. 3—the supply of pressure-fluid to the spray nozzles 34, 35 will be started, the pressure-fluid being jetted from the nozzle 35b, which is not yet covered by the pallet 12, into the working space which is enclosed by the protective hood of the machine tool. A strong lateral flow will result in the intermediate gap between the surface of the slideway 14, 15 and the bottom of the pallet 12 at the mouth of the nozzle 35a, which is already covered by the pallet, Whereby any deposits of chips or other particles possibly adhering to one or other of the surfaces will be flushed away with high kinetic energy. In the final phase shown in FIG. 3b, the pallet 12 is in its prescribed working position, in which clamping bolts 40 engage in corresponding apertures at the bottom of the pallet and draw the pallet 12 with a high compressive force against the surface of the slideways. Branch ducts 41, 42 branching off each of the high-pressure ducts 30, 31 lead to said clamping bolts. As soon as the pallet has reached the final position illustrated in FIG. 3b, adjusting pins (not illustrated) or other precise abutment means will become effective. At the same time pressure cushions 43a, 43b, 44a, and 44b will be formed at the nozzles 34, 35 on which cushions the pallet 12 floats, so to speak, so that any slight lateral adjusting movements of the pallet 12 are performed substantially without any friction. It is only when the clamping bolts 40 are tightened that in the final phase the entire fluid will be squeezed from the gap-like pressure cushions so that the pallet 12 will rest in closely fitting and large-area contact on the predetermined surfaces of the slideways. The present invention is not limited to the above-described embodiment thereof. Rather, it would also be conceivable to provide pallet carriers of different types with the pressure-fluid ducts, for example pallet carriers onto which the pallets are set from above by a lowering movement. Of course, in that case the quick-action connectors in the pallets for providing communication with the pressure-fluid would have a different appropriate configuration.

I claim:

1. A pallet carrier for machine tools comprising:
   an NC work table for mounting said carrier thereon;
   profile slideways, centering elements and hydraulic clamping members;
   pressure-fluid ducts formed within said carrier;
   quick-action connectors located in the front of the pallet carrier coupled to said ducts; and
   spray nozzles disposed in slide faces of said slideways coupled to said ducts.

2. The pallet carrier of claim 1, wherein said pressure-fluid ducts are in fluid communication with branch ducts, said branch ducts leading to the centering elements and the clamping members disposed in said slideways.

3. The pallet carrier of claim 1, wherein the quick-action connectors are configured as hollow cylinders for sealing accommodation of a horizontally insertable fitting.

* * * * *